United States Patent
Fan et al.

(10) Patent No.: US 12,537,226 B2
(45) Date of Patent: Jan. 27, 2026

(54) HIGH-TEMPERATURE LITHIUM SECONDARY BATTERY ELECTROLYTE AND BATTERY CELL

(71) Applicant: GUANGZHOU TINCI MATERIALS TECHNOLOGY CO., LTD., Guangzhou (CN)

(72) Inventors: Chaojun Fan, Guangzhou (CN); Weizhen Fan, Guangzhou (CN); Yong Xin, Guangzhou (CN); Jingwei Zhao, Guangzhou (CN)

(73) Assignee: GUANGZHOU TINCI MATERIALS TECHNOLOGY CO., LTD., Guangzhou (CN)

(*) Notice: Subject to any disclaimer, the term of this patent is extended or adjusted under 35 U.S.C. 154(b) by 879 days.

(21) Appl. No.: 17/781,401

(22) PCT Filed: Sep. 24, 2020

(86) PCT No.: PCT/CN2020/117528
§ 371 (c)(1),
(2) Date: Jun. 1, 2022

(87) PCT Pub. No.: WO2021/109687
PCT Pub. Date: Jun. 10, 2021

(65) Prior Publication Data
US 2023/0027087 A1    Jan. 26, 2023

(30) Foreign Application Priority Data
Dec. 2, 2019    (CN) .......................... 201911215997.1

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0025* (2013.01)

(58) Field of Classification Search
CPC ......... H01M 10/0567; H01M 10/0525; H01M 10/0569; H01M 2300/0025
See application file for complete search history.

(56) References Cited

U.S. PATENT DOCUMENTS

| | | | |
|---|---|---|---|
| 2009/0061303 A1 | 3/2009 | Inagaki et al. | |
| 2011/0091768 A1 | 4/2011 | Ohashi et al. | |
| 2011/0151338 A1 | 6/2011 | Yamamoto et al. | |
| 2013/0316227 A1* | 11/2013 | Nomura | H01M 4/366 429/188 |
| 2013/0316229 A1 | 11/2013 | Sawa et al. | |
| 2013/0323570 A1* | 12/2013 | Iwanaga | H01M 10/052 429/145 |
| 2014/0272595 A1 | 9/2014 | Cristadoro et al. | |
| 2016/0359196 A1 | 12/2016 | Kim et al. | |
| 2017/0237126 A1* | 8/2017 | Son | H01M 10/0525 429/188 |
| 2020/0212485 A1 | 7/2020 | Itabashi et al. | |
| 2020/0313237 A1 | 10/2020 | Hu et al. | |

FOREIGN PATENT DOCUMENTS

| | | | |
|---|---|---|---|
| CN | 101373848 A | 2/2009 | |
| CN | 103339784 A | 10/2013 | |
| CN | 106252710 A | 12/2016 | |
| CN | 2017022142 A | 1/2017 | |
| CN | 107851847 A | 3/2018 | |
| CN | 108258311 A | 7/2018 | |
| CN | 109755636 A | 5/2019 | |
| CN | 109888386 A | 6/2019 | |
| CN | 109950621 A | 6/2019 | |
| CN | 110021785 A * | 7/2019 | ........ H01M 10/0525 |
| CN | 110120553 A | 8/2019 | |
| CN | 110204553 A | 9/2019 | |
| CN | 110931869 A | 3/2020 | |
| JP | 2017037808 A | 2/2017 | |
| KR | 20160144123 A | 12/2016 | |
| WO | 2017004885 A1 | 1/2017 | |
| WO | WO-2019119765 A1 * | 6/2019 | ........ H01M 10/0569 |
| WO | 2021057597 A1 | 4/2021 | |

OTHER PUBLICATIONS

Machine Translation of CN-110021785-A (Aug. 20, 2025) (Year: 2025).*
Machine Translation of WO-2019119765-A1 (Aug. 20, 2025) (Year: 2025).*
Extended European Search Report for European Counterpart Application No. 20896075.7, mailed Oct. 11, 2024, 9 pages.
International Search Report and Written Opinion, and English Translation of the Search Report thereof, for International Application No. PCT/CN2020/117528, mailed Dec. 21, 2020 (14 pages).
Chinese First Office Action, and English Translation thereof, for counterpart Chinese Application No. 201911215997.1, mailed Dec. 14, 2021 (10 pages).
Supplemental Search Report for counterpart Chinese Application No. 201911215997.1, mailed Apr. 25, 2022 (2 pages).

* cited by examiner

*Primary Examiner* — Matthew J Merkling
(74) *Attorney, Agent, or Firm* — Kagan Binder, PLLC

(57) ABSTRACT

The invention relates to the technical field of secondary batteries, specifically to a high-temperature lithium secondary battery electrolyte and a battery cell. The high-temperature lithium secondary battery contains an additive composition consisting of a diisocyanate compound and a bicyclic sulfate compound.

19 Claims, No Drawings

HIGH-TEMPERATURE LITHIUM SECONDARY BATTERY ELECTROLYTE AND BATTERY CELL

CROSS REFERENCE TO RELATED APPLICATIONS

This application is a national stage for International Application PCT/CN2020/117528, filed on Sep. 24, 2020, which claims priority to Chinese Patent Application No. 201911215997.1, entitled "HIGH-TEMPERATURE LITHIUM SECONDARY BATTERY ELECTROLYTE AND BATTERY CELL" filed on Dec. 2, 2019. The entireties of both applications are incorporated by reference herein for all purposes.

TECHNICAL FIELD

The present disclosure relates to the technical field of lithium secondary batteries, and particularly relates to a high-temperature lithium secondary battery electrolyte and a battery.

BACKGROUND

With the popularization of portable electronic devices, secondary batteries required for the electronic devices tend to be miniaturized and light-weighted, so the energy density of the power sources for these devices is required to be higher and higher. Lithium secondary batteries are widely used in power, energy storage, aerospace, digital and other fields due to their advantages of high energy density, high charging efficiency, long cycle life, and the like.

A lithium secondary battery includes: a positive electrode composed of a transition metal oxide; a negative electrode composed of a carbon material, a silicon carbon material, or a lithium alloy; and an electrolyte composed of a lithium salt and a solvent.

Since the solvent is volatile and flammable, when the battery is used under overcharge or overdischarge or under extreme conditions, short circuits or fire may be caused inside the battery due to heat generation, and the high-temperature stability of the lithium secondary battery is reduced.

The applicant, Shanshan Advanced Materials (Quzhou) Co., Ltd., filed a patent application of CN 201910199170.X in 2019, which discloses a high-temperature and high-pressure safety lithium ion battery electrolyte and a lithium ion battery. The lithium ion battery electrolyte of this disclosure includes a lithium salt, a non-aqueous organic solvent, and an additive, and the additive includes an isocyanate additive, a film-forming additive, and a fluorinated flame retardant additive. The lithium ion battery electrolyte can form a stable solid electrolyte interphase (SEI) film on the surface of an electrode material by adding a first type of isocyanate additive and a second type of film-forming additive, which is beneficial to ion conduction and can inhibit the decomposition of the electrolyte; by adding a third type of fluorinated flame retardant, F atoms can not only form a film at an electrode interface, but also reduce the intermolecular force, thereby reducing the viscosity of the electrolyte and improving the conductivity of the electrolyte. The synergistic effect of each component enables the battery to have good high-temperature storage performance, normal temperature cycling performance, and high-temperature cycling performance under high voltage without potential safety hazard.

The sixth and eleventh paragraphs of the specification disclose that diisocyanate additives and monocyclic sulfate compounds are used to improve the performance of batteries in high-temperature and high-pressure application environments.

From the Table 1, it can be seen that the effect of the combination of DTD and toluene diisocyanate (Example 7) is superior to that of the case of using only monoisocyanate in normal temperature electrical performance and high-temperature electrical performance (stored at 60° C.).

The applicants, Dongguan Shanshan Battery Materials Co., Ltd. and Shanshan Advanced Materials (Quzhou) Co., Ltd., filed an invention patent application of CN 201910104215.0 in 2019, which disclose a lithium ion battery electrolyte and a lithium ion battery containing the same. The lithium ion battery electrolyte of this disclosure includes a lithium salt, an organic solvent, and additives, wherein the additives include sulfur-containing compounds M and N as additives. The additive M can participate in the formation of a passivation film at an interface of positive and negative electrodes, so that the high-temperature performance is improved and the gas production of the battery is inhibited, and the additive N has good effects on improving the cycling performance of the battery and adjusting the impedance. Through the combined use of compounds M and N, the cycling performance and storage performance of a battery system may be optimized, and the battery system can have a lower impedance, achieving the comprehensive effect of taking into account the high and low temperature performance of the battery.

As described in paragraphs 6 to 7 of the specification, it can be seen that the cyclic sulfonate compound and the isocyanate compound contribute to the improvement of the electrical performances at normal temperature, high temperature, and low temperature.

As the original contributor to this technology node, the applicant, Mitsubishi Chemical Corporation, filed an invention patent application CN 201280007151.9 in 2012, as described in paragraphs 25 and 27 of the specification, which can employ the following compounds: (A) at least one compound selected from the group consisting of: carbonates having a carbon-carbon unsaturated bond, compounds represented by the general formula (1), sulfoxides, sulfites, sulfones, sulfonates, sultones, and sulfates; (B) cyclic carbonates having a fluorine atom; and (C) compounds having at least two isocyanate groups in molecule thereof.

Its main purpose is to improve the storage and cycling performance of the battery at normal temperature.

It can be known from the above-mentioned prior arts that the diisocyanate compounds and cyclic sulfates/compounds have certain contributions to the performances of storage and cycling, etc., at normal temperature, high temperature, and low temperature.

The applicant, Shenzhen Capchem Technology Co., Ltd., filed an invention patent application of CN 201711391825.0 in 2017, which discloses a non-aqueous electrolyte for a lithium ion battery, comprising a bicyclic sulfate compound and a compound A shown in the structural formula 1. In the structural formula 1, R3, R4, R5, R6, R7, and R8 are each independently selected from a hydrogen atom, a fluorine atom, or a group containing 1 to 5 carbon atoms.

From the description in Table 1, it can be seen that the bicyclic sulfate compound is inferior to the combination of the bicyclic sulfate compound and the bispropenyl carbonate lactone compound in terms of electrical performances (high-temperature storage and cycling performance).

To sum up, any one of the bicyclic sulfate compounds, the monoisocyanate compounds, the diisocyanate compounds, and the monocyclic sulfate compounds cannot achieve the optimal performance when used alone.

In addition, there is also no evidence directly pointing out that the diisocyanate compound and the bispropenyl carbonate lactone compound have similar properties and have any interchangeability.

The technical problem to be solved by the present application is that how to further develop the electrolyte on the basis of the prior art to significantly improve the electrochemical performance of the conventional electrolyte.

SUMMARY

An object of the present disclosure is to provide a high-temperature lithium secondary battery electrolyte including an additive composition composed of a diisocyanate compound and a bicyclic sulfate compound. When the composition is used together, by means of a synergistic effect, a flexible, thin and uniform SEI film is formed on a surface of a negative electrode of the lithium secondary battery, and a surface of a positive electrode is passivated, so that the amount of gas produced by the lithium secondary battery during high-temperature storage periods is inhibited, the high-temperature cycling performance and high-temperature storage performance are improved, and the cycle life is prolonged.

Another object of the present disclosure is to provide a battery including the above-mentioned high-temperature lithium secondary battery electrolyte.

The technical solutions of the present disclosure are as follows.

A high-temperature lithium secondary battery electrolyte, being composed of a non-aqueous solvent, a lithium salt, and an additive, wherein the additive is composed of a diisocyanate compound shown in General Formula I and a bicyclic sulfate compound shown in General Formula II;

General Formula I

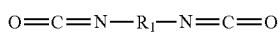

General Formula II

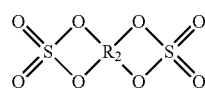

wherein $R_1$ is a linking group containing 4 to 12 carbon atoms, and $R_2$ is a linking group containing 2 to 6 carbon atoms.

In the above-mentioned high-temperature lithium secondary battery electrolyte, $R_1$ is selected from the group consisting of alkyl, cycloalkyl, phenyl, heterocyclyl, and halogen substituents thereof; $R_2$ is selected from the group consisting of alkyl, cycloalkyl, phenyl, and halogen substituents thereof.

In the above-mentioned high-temperature lithium secondary battery electrolyte, the diisocyanate compound is at least one of compounds having the following structures:

[Formula 1a]

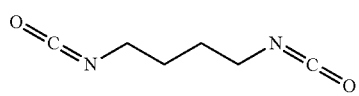

[Formula 1b]

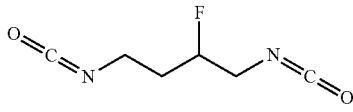

[Formula 1c]

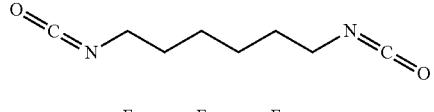

[Formula 1d]

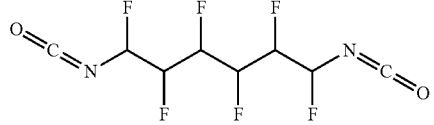

[Formula 1e]

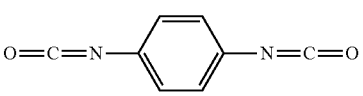

[Formula 1f]

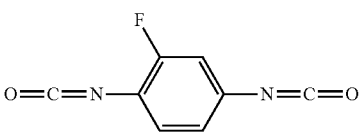

[Formula 1g]

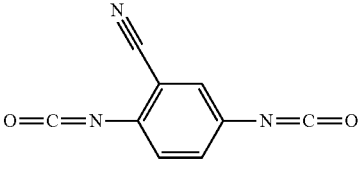

[Formula 1h]

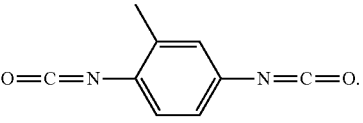

The diisocyanate compound is a compound containing two isocyanate groups, which can be used as an additive in the lithium secondary battery electrolyte. The diisocyanate compound can promote the electrolyte to form a thin and uniform film on the positive and negative electrodes of the battery, and specifically, the diisocyanate compound mainly promotes the electrolyte to form a flexible solid electrolyte interface film (SEI film) on the negative electrode, which can effectively reduce the damage to the negative electrode structure caused by the intercalation and deintercalation of lithium ions, and reduce reactions between the negative electrode and other materials, thereby improving the life of battery. In addition, the isocyanate group can react with trace water in the electrolyte, no by-product is generated, and has an excellent effect on stabilizing bicyclic sulfates, LiPF6, and other water-sensitive substances, that is, it can improve the stability of the non-aqueous electrolyte, reduce the gas production during high-temperature storage, and improve the high-temperature storage performance.

The diisocyanate compound may be 0.03 to 3 parts by weight, preferably 0.03 to 1 part by weight, based on 100 parts by weight of the total weight of the electrolyte. In the case of using the diisocyanate compound within the above range, a stable SEI film may be formed on the negative electrode as described above, and corresponding effects may be produced. When the amount added is too small, the formed SEI film is too thin to protect the negative electrode; however, when the content of the additive is too high, the formed SEI film is too thick, which will increase the overall impedance of the battery and affect the battery capacity.

In the above-mentioned high-temperature lithium secondary battery electrolyte, the bicyclic sulfate compound is at least one selected from Formula 2a to Formula 2h:

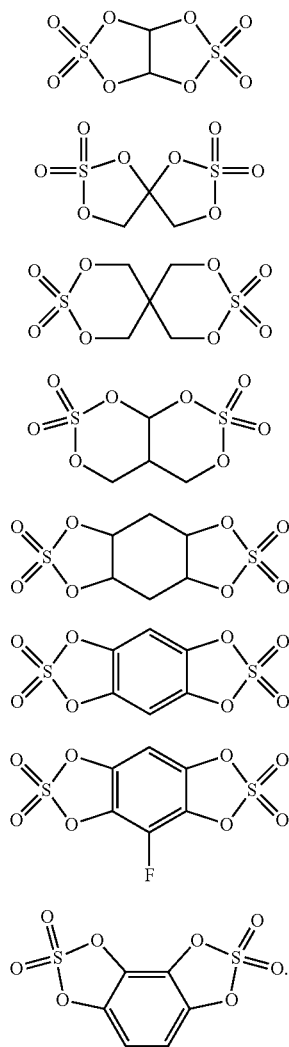

[Formula 2a]

[Formula 2b]

[Formula 2c]

[Formula 2d]

[Formula 2e]

[Formula 2f]

[Formula 2g]

[Formula 2h]

In the case where the bicyclic sulfate compound is included in the electrolyte, the bicyclic sulfate compound may be 0.1 to 5 parts by weight, preferably 0.1 to 3 part by weight, based on 100 parts by weight of the total weight of the electrolyte. When the amount added is too low, the improvement effect on the battery performance is not obvious; however, when the amount added is too large, the chemical instability caused by the structure of the bicyclic sulfate compound will be serious, which will lead to excessive side reactions with other components in the electrolyte, and the added diisocyanate compound is not enough to stabilize the structure of the bicyclic sulfate compound, resulting in serious gas production and poor high-temperature performance of the battery.

In the above-mentioned high-temperature lithium secondary battery electrolyte, the non-aqueous solvent is composed of a cyclic compound and a linear compound; the non-aqueous solvent accounts for 10% to 90% of the total weight of the electrolyte.

The cyclic compound is at least one selected from the group consisting of ethylene carbonate, propylene carbonate, γ-butyrolactone, sulfolane, and fluoroethylene carbonate.

The linear compound is at least one selected from the group consisting of dimethyl carbonate, methyl ethyl carbonate, diethyl carbonate, methyl propyl carbonate, ethyl acetate, propyl propionate, ethyl propionate, propyl acetate, methyl propionate, 1,1,2,2-tetrafluoroethyl-2,2,3,3-tetrafluoropropyl ether, and 2,2-difluoroethyl acetate.

In the above-mentioned high-temperature lithium secondary battery electrolyte, the lithium salt is at least one selected from the group consisting of $LiPF_6$, $LiAsF_6$, $LiClO_4$, $LiBF_4$, $LiB(C_2O_4)_2$, $LiBF_2C_2O_4$, $LiN(SO_2F)_2$, $LiN(SO_2CF_3)_2$, $LiPO_2F_2$, $LiPF_2(C_2O_4)_2$, and $LiPF_4C_2O_4$; and the lithium salt accounts for 8% to 20% of the total weight of the electrolyte.

In addition, the present disclosure also discloses a high-temperature lithium secondary battery composed of a positive electrode, a negative electrode, a separator arranged between the positive electrode and the negative electrode, and the high-temperature lithium secondary battery electrolyte as described above.

The positive electrode material of the lithium secondary battery includes, but is not limited to, one or more of $Li_{1+a}(Ni_xCo_yM_{1-x-y})O_2$, $Li(Ni_pMn_qCo_{2-p-q})O_4$, and $LiM_h(PO_4)_m$; wherein $0 \le a \le 0.3$, $0 \le x \le 1$, $0 \le y \le 1$, $0 < x+y \le 1$; $0 \le p \le 2$, $0 \le q \le 2$, $0 < p+q \le 2$; $0 < h < 5$, $0 < m < 5$; M is Fe, Ni, Co, Mn, Al, or V.

The present disclosure has beneficial effects as follows.

The additive composition of electrolyte of the present disclosure may inhibit the amount of gas produced during high-temperature storage of the lithium secondary battery and improve the high-temperature cycle life.

Due to the synergistic effect of diisocyanate and bicyclic sulfate, a flexible, thin and uniform SEI film can be formed on the surface of the negative electrode of the lithium secondary battery, and the surface of the positive electrode is passivated, so that the above lithium secondary battery has good high-temperature performance. The lithium secondary battery has good high-temperature storage performance and cycle life, and has good capacity retention rate when stored or used under high-temperature conditions.

DETAILED DESCRIPTION OF THE EMBODIMENTS

The technical solution of the present disclosure will be further described in detail below in combination with the specific embodiments, which do not constitute any limitation to the present disclosure.

Example 1

In this example, an electrolyte (100 g) containing a solvent in which ethylene carbonate and methyl ethyl carbonate were mixed at a mass ratio of 1:2 and 1M LiPF6 was prepared. The diisocyanate compound (0.03 g) of the above Formula 1c and the bicyclic sulfate compound (1.0 g) of the above Formula 2a were added to the electrolyte, the positive electrode material was LiNi0.8Co0.1Mn0.1O2; the negative electrode material was artificial graphite; and the separator was a polyethylene film. A soft-pack lithium secondary battery was assembled according to a conventional method.

Example 2

A lithium secondary battery was prepared in the same manner as in Example 1, except that the diisocyanate compound (0.5 g) of the above Formula 1c and the bicyclic sulfate compound (0.1 g) of the above Formula 2a were added to the non-aqueous electrolyte of Example 1 in place of the diisocyanate compound (0.03 g) of the above Formula 1c and the bicyclic sulfate compound (1.0 g) of the above Formula 2a.

Example 3

A lithium secondary battery was prepared in the same manner as in Example 1, except that the diisocyanate compound (3.0 g) of the above Formula 1c and the bicyclic sulfate compound (1.0 g) of the above Formula 2a were added to the non-aqueous electrolyte of Example 1 in place of the diisocyanate compound (0.03 g) of the above Formula 1c and the bicyclic sulfate compound (1.0 g) of the above Formula 2a.

Example 4

A lithium secondary battery was prepared in the same manner as in Example 1, except that the diisocyanate compound (0.5 g) of the above Formula 1c and the bicyclic sulfate compound (5.0 g) of the above Formula 2a were added to the non-aqueous electrolyte of Example 1 in place of the diisocyanate compound (0.03 g) of the above Formula 1c and the bicyclic sulfate compound (1.0 g) of the above Formula 2a.

Example 5

A lithium secondary battery was prepared in the same manner as in Example 1, except that the diisocyanate compound (0.5 g) of the above Formula 1c and the bicyclic sulfate compound (1.0 g) of the above Formula 2a were added to the non-aqueous electrolyte of Example 1 in place of the diisocyanate compound (0.03 g) of the above Formula 1c and the bicyclic sulfate compound (1.0 g) of the above Formula 2a.

Example 6

A lithium secondary battery was prepared in the same manner as in Example 1, except that the diisocyanate compound (0.5 g) of the above Formula 1c and the bicyclic sulfate compound (1.0 g) of the above Formula 2c were added to the non-aqueous electrolyte of Example 1 in place of the diisocyanate compound (0.03 g) of the above Formula 1c and the bicyclic sulfate compound (1.0 g) of the above Formula 2a.

Example 7

A lithium secondary battery was prepared in the same manner as in Example 1, except that the diisocyanate compound (0.5 g) of the above Formula 1c and the bicyclic sulfate compound (1.0 g) of the above Formula 2d were added to the non-aqueous electrolyte of Example 1 in place of the diisocyanate compound (0.03 g) of the above Formula 1c and the bicyclic sulfate compound (1.0 g) of the above Formula 2a.

Example 8

A lithium secondary battery was prepared in the same manner as in Example 1, except that the diisocyanate compound (0.5 g) of the above Formula 1c and the bicyclic sulfate compound (1.0 g) of the above Formula 2f were added to the non-aqueous electrolyte of Example 1 in place of the diisocyanate compound (0.03 g) of the above Formula 1c and the bicyclic sulfate compound (1.0 g) of the above Formula 2a.

Example 9

A lithium secondary battery was prepared in the same manner as in Example 1, except that the diisocyanate compound (0.2 g) of the above Formula 1e and the bicyclic sulfate compound (1.0 g) of the above Formula 2a were added to the non-aqueous electrolyte of Example 1 in place of the diisocyanate compound (0.03 g) of the above Formula 1c and the bicyclic sulfate compound (1.0 g) of the above Formula 2a.

Example 10

A lithium secondary battery was prepared in the same manner as in Example 1, except that the diisocyanate compound (0.2 g) of the above Formula 1e and the bicyclic sulfate compound (1.0 g) of the above Formula 2c were added to the non-aqueous electrolyte of Example 1 in place of the diisocyanate compound (0.03 g) of the above Formula 1c and the bicyclic sulfate compound (1.0 g) of the above Formula 2a.

Comparative Example 1

In this comparative example, an electrolyte (100 g) containing a solvent in which ethylene carbonate and diethyl carbonate were mixed at a mass ratio of 1:2 and 1M LiPF6 was prepared. A non-aqueous electrolyte was prepared by adding the diisocyanate compound (0.5 g) of the above Formula 1c to the electrolyte. The positive electrode material was LiNi0.8Co0.1Mn0.1O2; the negative electrode material was artificial graphite; and the separator was a polyethylene film. A soft-pack lithium secondary battery was assembled according to a conventional method.

Comparative Example 2

A lithium secondary battery was prepared in the same manner as in Comparative Example 1, except that the bicyclic sulfate compound (1.0 g) of the above Formula 2a was added to the non-aqueous electrolyte of Comparative Example 1 in place of the diisocyanate compound (0.5 g) of the above Formula 1c.

Comparative Example 3

Comparative Example 3 is different from Comparative Example 1 in that no diisocyanate compound was contained in the electrolyte.

Comparative Example 4

Comparative Example 4 is different from Comparative Example 1 in that the diisocyanate compound (1.5 g) of the above Formula 1c was added to the non-aqueous electrolyte of Comparative Example 1 in place of the diisocyanate compound (0.5 g) of the above Formula 1c.

Comparative Example 5

Comparative Example 5 is different from Comparative Example 1 in that the bicyclic sulfate compound (1.5 g) of the above Formula 2a was added to the non-aqueous electrolyte of Comparative Example 1 in place of the diisocyanate compound (0.5 g) of the above Formula 1c.

Comparative Example 6

Comparative Example 6 is different from Comparative Example 1 in that the diisocyanate compound (0.5 g) of the above Formula 1c and an ethylene sulfate (DTD) compound (1.0 g) were added to the non-aqueous electrolyte of Comparative Example 1 in place of the diisocyanate compound (0.5 g) of the above Formula 1c.

Comparative Example 7

Comparative Example 7 is different from Comparative Example 1 in that a vinylene carbonate (VC) compound (1.0 g) was added to the non-aqueous electrolyte of Comparative Example 1 in place of the diisocyanate compound (0.5 g) of the above Formula 1c.

2. High-Temperature Performance Test for Lithium Secondary Battery

The lithium secondary batteries in Examples 1 to 10 and Comparative Examples 1 to 7 were tested for high-temperature performance, and the test methods are as follows.

High-temperature cycling performance: the lithium secondary battery was placed in a thermostat at 45° C., charged to 4.2 V at a constant voltage and constant current of 1 C, then discharged to 3.0 V at a constant current of 1 C, and cycled for 500 weeks to determine the capacity retention rate of lithium ion battery.

High-temperature storage performance: the formed lithium ion battery was charged to 4.2 V at a constant voltage and constant current of 1 C at normal temperature, and the initial capacity of the battery was measured; then after 30 days of storage at 60° C., the lithium ion battery was discharged to 3.0 V at 1 C, and the capacity retention rate of the lithium secondary battery was tested; then the lithium ion battery was charged to 4.2 V at a constant voltage and constant current of 1 C, and the capacity recovery rate of the lithium secondary battery was measured.

The test results are shown in Table 1:

TABLE 1

| Number | Additive Number | Capacity retention rate after 500 weeks of high-temperature cycling/% | Capacity retention rate after 30 days of high-temperature storage/% | Capacity recovery rate after 30 days of high-temperature storage/% |
|---|---|---|---|---|
| Example 1 | 0.03% 1c + 1% 2a | 80.1 | 81.2 | 83.5 |
| Example 2 | 0.5% 1c + 0.1% 2a | 79.2 | 80.9 | 83.8 |
| Example 3 | 3% 1c + 1% 2a | 80.5 | 81.4 | 82.3 |
| Example 4 | 0.5% 1c + 5% 2a | 81.0 | 81.5 | 83.0 |
| Example 5 | 0.5% 1c + 1% 2a | 84.4 | 83.9 | 88.7 |
| Example 6 | 0.5% 1c + 1% 2c | 85.7 | 87.5 | 89.3 |
| Example 7 | 0.5% 1c + 1% 2d | 84.2 | 84.5 | 86.9 |
| Example 8 | 0.5% 1c + 1% 2f | 85.4 | 84.1 | 87.6 |
| Example 9 | 0.2% 1e + 1% 2a | 84.2 | 83.9 | 85.7 |
| Example 10 | 0.2% 1e + 1% 2c | 85.5 | 87.4 | 90.2 |
| Comparative Example 1 | 0.5% 1c | 78.5 | 79.8 | 83.3 |
| Comparative Example 2 | 1% 2a | 78.7 | 79.4 | 82.1 |
| Comparative Example 3 | none | 74.2 | 75.1 | 77.4 |
| Comparative Example 4 | 1.5% 1c | 78.2 | 80.2 | 83.6 |
| Comparative Example 5 | 1.5% 2a | 78.3 | 79.8 | 80.4 |
| Comparative Example 6 | 0.5% 1c + 1% DTD | 79.6 | 78.3 | 83.7 |
| Comparative Example 7 | 1% VC | 72.9 | 73.2 | 75.7 |

It can be seen from Table 1 that the high-temperature cycling performance, high-temperature storage performance, and low-temperature discharge performance of the lithium ion batteries of Examples 1 to 10 are superior to those of Comparative Examples 1 to 8, which indicates that the electrolyte additives in Examples 1 to 10 can effectively improve the high-temperature performance of lithium secondary batteries.

To be specific:
1. It can be known from Examples 5 to 8 and Comparative Examples 1 and 2 that the use of diisocyanate compounds or bicyclic sulfate compounds alone cannot achieve satisfactory electrochemical effects.
2. It can be known from Examples 5 to 8 and Comparative Example 6 that the combination of the diisocyanate compound and the monocyclic sulfate composite cannot achieve satisfactory electrochemical effects.
3. It can be known from Examples 5 to 10 and Comparative Examples 4 and 5 that when used alone, even if the amount of diisocyanate compounds or bicyclic sulfate compounds are increased, satisfactory electrochemical effects cannot be achieved.

Moreover, Example 6 of the present disclosure can demonstrate that not all additives with high-temperature improvement can achieve good results when combined with diisocyanates.

Comparative Examples 3 to 6 of the patent application 201711391825.0 can prove that not all additives with high-temperature improvement can achieve good results when combined with bicyclic sulfate compounds.

Therefore, the combination of diisocyanate compounds and bicyclic sulfate compounds can only be obtained after a lot of repeated tests that the two have a good synergistic effect.

The above-mentioned examples are preferred embodiments of the present disclosure, but the embodiments of the present disclosure are not limited by the above-mentioned examples, and any other changes, modifications, substitutions, combinations, simplifications that do not deviate from the spirit and principle of the present disclosure should be equivalent substitution mode, and are included in the protection scope of the present disclosure.

The invention claimed is:

1. A high-temperature lithium secondary battery electrolyte, being composed of a non-aqueous solvent, a lithium salt, and an additive, wherein the additive is composed of a diisocyanate compound shown in General Formula I and a bicyclic sulfate compound shown in General Formula II;

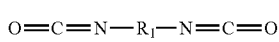

General Formula I

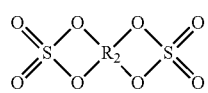

General Formula II wherein, $R_1$ is a linking group containing 4 to 12 carbon atoms, and $R_2$ is a linking group containing 2 to 6 carbon atoms.

2. The high-temperature lithium secondary battery electrolyte of claim 1, wherein $R_1$ is selected from the group consisting of alkyl, cycloalkyl, phenyl, heterocyclyl, and halogen substituents thereof; $R_2$ is selected from the group consisting of alkyl, cycloalkyl, phenyl, and halogen substituents thereof.

3. The high-temperature lithium secondary battery electrolyte of claim 1, wherein the diisocyanate compound is at least one of compounds having the following structures:

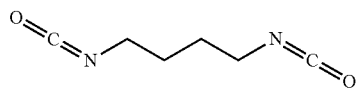

[Formula 1a]

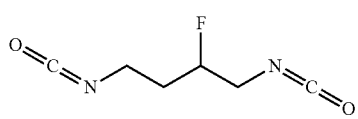

[Formula 1b]

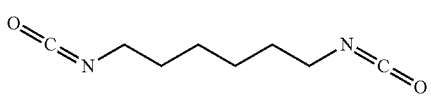

[Formula 1c]

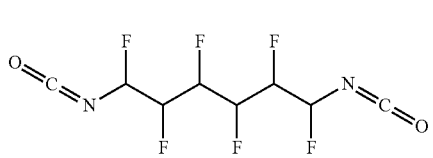

[Formula 1d]

[Formula 1e]

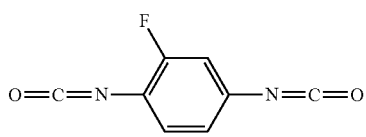

[Formula 1f]

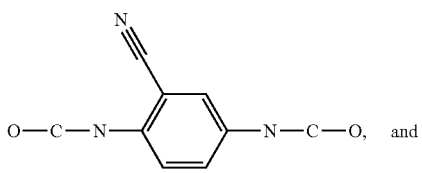

[Formula 1g]

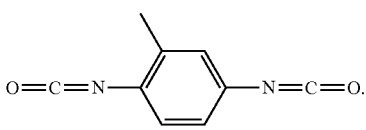

[Formula 1h]

4. The high-temperature lithium secondary battery electrolyte of claim 1, wherein the bicyclic sulfate compound is at least one selected from Formula 2a to Formula 2h:

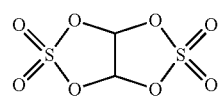

[Formula 2a]

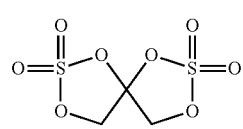

[Formula 2b]

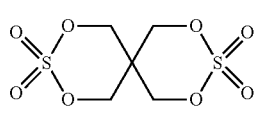

[Formula 2c]

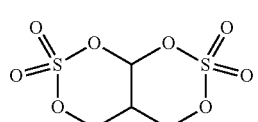

[Formula 2d]

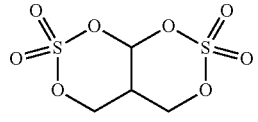

[Formula 2e]

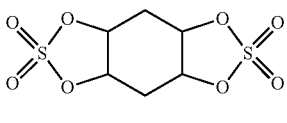

[Formula 2f]

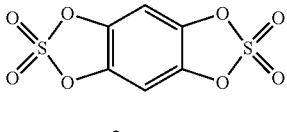

[Formula 2g]

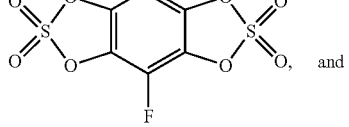

[Formula 2h]

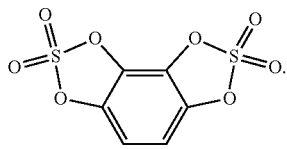

5. The high-temperature lithium secondary battery electrolyte of claim 1, wherein a weight of the diisocyanate compound is 0.03% to 3% of a total weight of the electrolyte.

6. The high-temperature lithium secondary battery electrolyte of claim 5, wherein the weight of the diisocyanate compound is 0.03% to 1% of the total weight of the electrolyte.

7. The high-temperature lithium secondary battery electrolyte of claim 1, wherein a weight of the bicyclic sulfate compound is 0.1% to 5% of a total weight of the electrolyte.

8. The high-temperature lithium secondary battery electrolyte of claim 6, wherein the weight of the bicyclic sulfate compound is 0.1% to 3% of the total weight of the electrolyte.

9. The high-temperature lithium secondary battery electrolyte of claim 1, wherein the non-aqueous solvent is composed of a cyclic compound and a linear compound.

10. A high-temperature lithium secondary battery, being composed of a positive electrode, a negative electrode, a separator arranged between the positive electrode and the negative electrode, and the high-temperature lithium secondary battery electrolyte of claim 1.

11. The high-temperature lithium secondary battery electrolyte of claim 1, wherein the non-aqueous solvent accounts for 10% to 90% of a total weight of the electrolyte.

12. The high-temperature lithium secondary battery electrolyte of claim 9, wherein the cyclic compound is at least one selected from the group consisting of ethylene carbonate, propylene carbonate, γ-butyrolactone, sulfolane, and fluoroethylene carbonate.

13. The high-temperature lithium secondary battery electrolyte of claim 9, wherein the linear compound is at least one selected from the group consisting of dimethyl carbonate, methyl ethyl carbonate, diethyl carbonate, methyl propyl carbonate, ethyl acetate, propyl propionate, ethyl propionate, propyl acetate, methyl propionate, 1,1,2,2-tetrafluoroethyl-2,2,3,3-tetrafluoropropyl ether, and 2,2-difluoroethyl acetate.

14. The high-temperature lithium secondary battery electrolyte of claim 1, wherein the lithium salt is at least one selected from the group consisting of $LiPF_6$, $LiAsF_6$, $LiClO_4$, $LiBF_4$, $LiB(C_2O_4)_2$, $LiBF_2C_2O_4$, $LiN(SO_2F)_2$, $LiN(SO_2CF_3)_2$, $LiPO_2F_2$, $LiPF_2(C_2O_4)_2$, and $LiPF_4C_2O_4$.

15. The high-temperature lithium secondary battery electrolyte of claim 1, wherein the lithium salt accounts for 8% to 20% of the total weight of the electrolyte.

16. The high-temperature lithium secondary battery electrolyte of claim 1, wherein a weight of the diisocyanate compound is 0.03% to 3% of a total weight of the electrolyte, and a weight of the bicyclic sulfate compound is 0.1% to 5% of a total weight of the electrolyte.

17. The high-temperature lithium secondary battery electrolyte of claim 1, wherein $R_1$ is selected from the group consisting of unsubstituted or halogen-substituted cycloalkyl, unsubstituted or halogen-substituted phenyl, unsubstituted or halogen-substituted heterocyclyl, and halogen-substituted alkyl; $R_2$ is selected from the group consisting of cycloalkyl, phenyl, and halogen substituents thereof.

18. The high-temperature lithium secondary battery electrolyte of claim 1, wherein the diisocyanate compound is at least one of compounds having the following structures:

[Formula 1d]

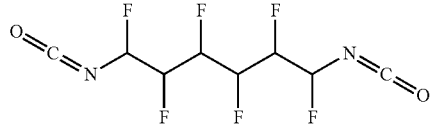

[Formula 1e]

[Formula 1f]

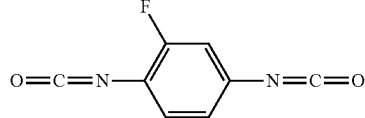

[Formula 1g]

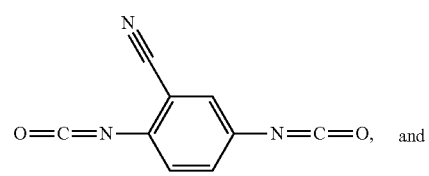

and

[Formula 1h]

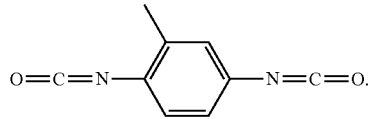

19. The high-temperature lithium secondary battery electrolyte of claim 1, wherein the bicyclic sulfate compound is at least one selected from Formula 2a to Formula 2 h:

[Formula 2e]

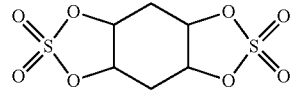

[Formula 2f]

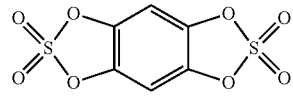

[Formula 2g]

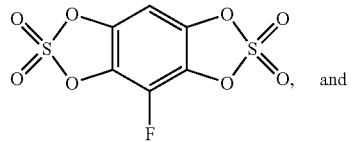

and

[Formula 2h]

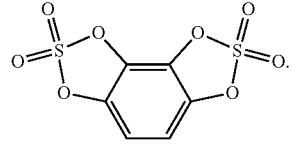

* * * * *